United States Patent

Tetreault

[11] Patent Number: 6,121,890
[45] Date of Patent: Sep. 19, 2000

[54] ELECTRONIC INDICATOR WITH ADJUSTABLE RATIO OF SPINDLE DISPLACEMENT TO DISPLAYED VALUE

[75] Inventor: Raymond W. Tetreault, W. Greenwich, R.I.

[73] Assignee: Mahr Federal, Inc., Providence, R.I.

[21] Appl. No.: 09/390,550

[22] Filed: Sep. 3, 1999

Related U.S. Application Data

[60] Provisional application No. 60/099,623, Sep. 8, 1998.

[51] Int. Cl.⁷ .................................................. G08B 5/36
[52] U.S. Cl. ............................. 340/815.53; 340/815.62; 340/815.64; 340/870.04; 33/558; 33/561; 73/1.79; 73/866.3
[58] Field of Search .................... 340/815.4, 815.62, 340/815.64, 815.53, 870.02, 870.04, 870.05; 73/1.01, 1.79, 1.81, 866.3; 33/505, 679.1, 558, 561

[56] References Cited

U.S. PATENT DOCUMENTS

| | | | |
|---|---|---|---|
| 4,420,888 | 12/1983 | Wakao et al. | 33/558 |
| 4,528,755 | 7/1985 | Kanda et al. | 33/558 |
| 5,768,798 | 6/1998 | Takahashi et al. | 33/559 |
| 5,979,069 | 11/1999 | Hayashida et al. | 33/556 |

*Primary Examiner*—Daniel J. Wu
*Attorney, Agent, or Firm*—Morse, Altman & Martin

[57] ABSTRACT

An electronic indicator that includes a means for a scaling the actual displacement of the spindle by a user-adjustable scale factor representing the ratio of the actual displacement of a spindle to the value displayed. The indicator includes a body, transducer assembly, controller, and display. The transducer outputs a value representing the spindle displacement to the controller. The controller converts the value to standard length units and scales the standard units by the desired ratio of the actual displacement to the displayed value, as set by the user prior to use of the indicator.

7 Claims, 3 Drawing Sheets

6,121,890

ELECTRONIC INDICATOR WITH ADJUSTABLE RATIO OF SPINDLE DISPLACEMENT TO DISPLAYED VALUE

RELATED APPLICATIONS

The applicant wishes to claim the benefit of U.S. Provisional Patent Application No. 60/099,623, dated Sep. 8, 1998 for ADJUSTABLE-RATIO ELECTRONIC INDICATOR in the name of Raymond W. Tetreault.

BACKGROUND OF THE INVENTION

1. Field of the Invention

The present invention relates to electronic indicators, more particularly, to an electronic indicator that has a spindle displacement to measurement display ratio that can be set by the user.

2. The Prior Art

A mechanical dial indicator uses a longitudinally reciprocating rod, or spindle, to measure a length or distance, typically lengths that are not more than 3 or 4 inches, and to display that length on a dial face. In older dial indicators, the longitudinal motion of the spindle is translated to rotational motion for display on the dial face through the use of a rack and pinion. The teeth of the pinion mesh with and are driven by the teeth of the rack on the spindle, causing the pinion to rotate in response to the longitudinal movement of the spindle. The rotational motion of the pinion is transferred, via other gears, to a rotating dial hand. The dial hand indicates, via markings on the dial face, the distance that the spindle has traveled longitudinally relative to the pinion.

Since the late 1970's, electronic indicators have been developed. In the electronic indicator, the movement of the spindle is translated into an electronic signal representing the spindle displacement. That signal is either displayed, via a numerical display, on the face of the indicator, or is outputted via a connector for input to another instrument, or both.

Some uses of indicators require that measurements be taken where the variations between the work piece and spindle are not 1:1, due to unusual part configuration. Such applications include chamfer gauges, inside diameter/outside diameter gauges, fixture gauges where it is not possible to mount the indicator at a normal 9020 the part due to space constraints, and gauges involving lever-type motion transfer mechanisms. For example, a lever-type motion transfer mechanism may have the lever pivot nearer to the spindle end so that for every 3 mm displacement at the measuring end of the lever, the spindle end is only displaced by 2 mm. It would then be desirable to have an indicator that reads a 3 mm displacement for every 2 mm of actual displacement of the spindle so that the user does not have to perform the translation mentally or with a calculator.

One parameter that has been carried over from the mechanical dial indicator is the fixed ratio of the spindle displacement to the displayed or outputted value. The assumed ratio is 1:1. The display ratio is set at the factory and cannot be changed by the user. When a ratio other than 1:1 is implemented, for example the 3:2 ratio in the above example, the phrase 'Special Ratio' or an equivalent is typically added to the dial indicator to insure that the user knows that the readout responds to something other than 1:1 in reference to spindle movement. Consequently, users need a variety of electronic indicators if they need a variety of displacement-to-display ratios, at least one indicator for each ratio.

SUMMARY OF THE INVENTION

An object of the present invention is to provide an electronic indicator that internally scales the actual spindle measurement by an adjustable displacement-to-displayed value ratio.

An electronic indicator implementing the present invention consists of a housing, a transducer, a controller, and a display. The housing includes a body that is generally a flat hollow cylinder, a rear cover that is removably attached and that is available in a variety of configurations for attachment to equipment, and a rotatable bezel.

The transducer includes a sleeve that extends through the body and out opposite sides. A reciprocating axial spindle extends through the transducer sleeve. The spindle is biased to extend out one end of the sleeve. A knob screws into a threaded hole at the end of the spindle and has the contact point. The preferred transducer uses a capacitive sensor to measure the displacement of the spindle, although other technologies, such as resistive, inductive and optical, are contemplated.

The controller receives user inputs and the transducer sensor measurement and, after operating on these inputs, provides a value to the display representing the measurement of the work piece. The display typically has a numerical display, a bar graph, and a variety of mode icons. In its current embodiment, the user inputs are via three pushbuttons on the face of the bezel that toggle among and adjust various operating modes and parameters of the indicator. It is also contemplated that the indicator can be set up via an external connector.

One operating parameter of the indicator, and the subject of the present invention, is the ratio of the actual displacement of the spindle to the value that is displayed. The controller receives the sensor measurement, converts it to a displayable value, and displays it. When converting the sensor measurement to a displayable value representing the displacement, it must be scaled by a factor that converts the sensor units of spindle displacement to standard length units, such as inches or millimeters, that are readily understood. The present invention adds a spindle displacement-to-display value conversion as another scaling factor. For example, with a displacement-to-display ratio of 1:2, each 2 mm of actual spindle displacement represents a change of 1 mm. Consequently, prior to being displayed, the actual displacement is multiplied by 0.5 to obtain the display value. One setup mode of the indicator allows the user to adjust the displacement-to-display ratio.

Other objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION

Figure 1:
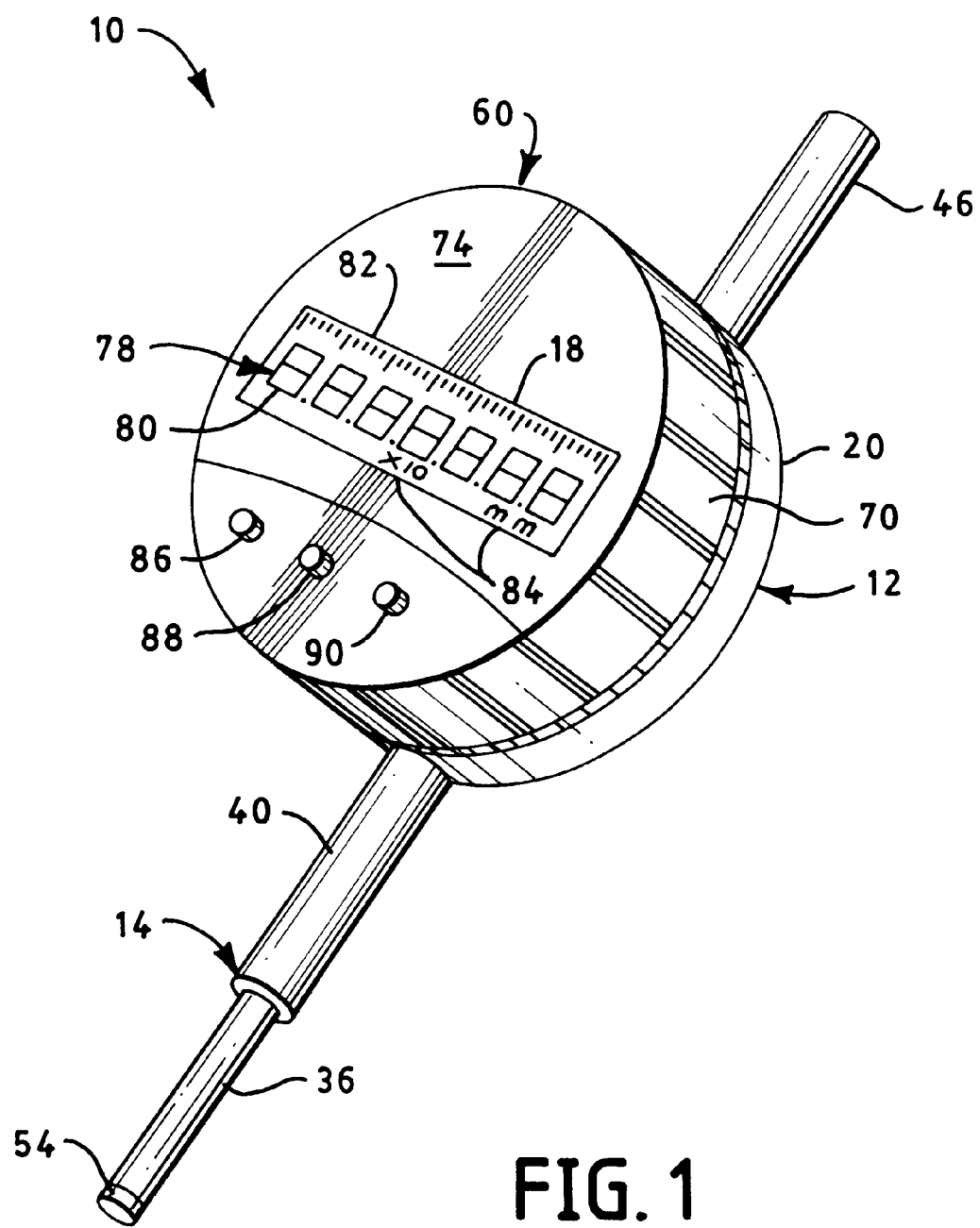
FIG. 1 is a perspective view of the electronic indicator of the present invention.
Figure 2:
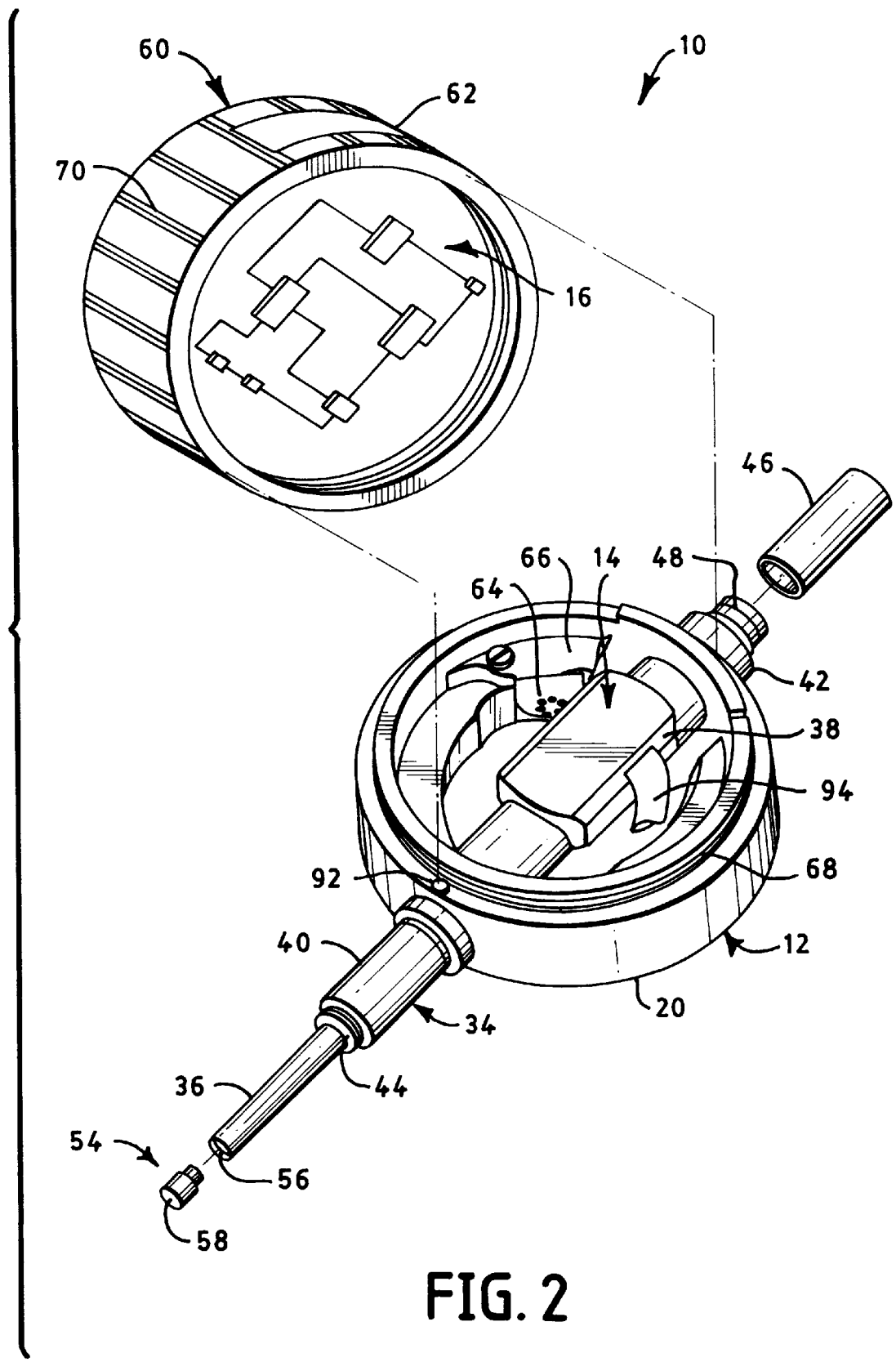
FIG. 2 is a partially exploded view of the indicator of FIG. 1.
Figure 3:
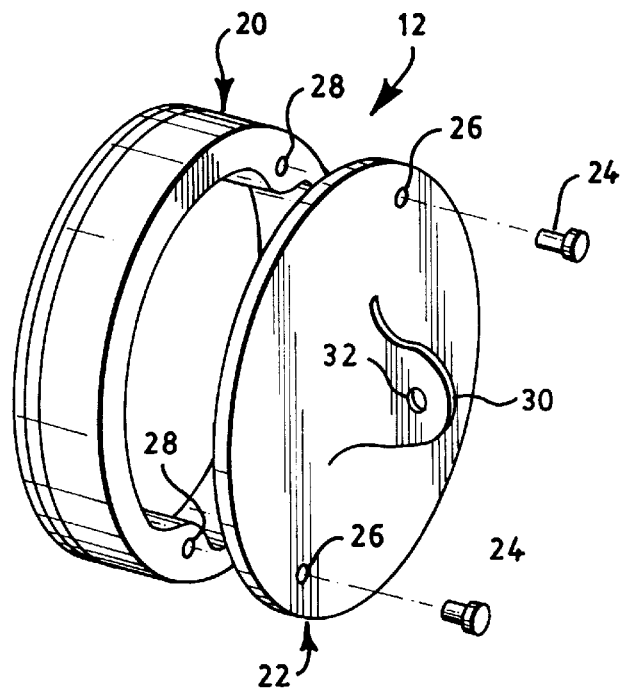
FIG. 3 is an exploded view of the body and rear cover of the indicator of FIG. 1.

An electronic indicator 10 implementing the present invention is shown in FIGS. 1–4, and consists of a housing 12, transducer 14, controller 16, and display 18.

The housing 12 includes a body 20, a rear cover 22, and bezel 60. The housing body 20 is generally a flat hollow cylinder. The diameter of the body 20 depends on the ASME Stanadard group number to which the particular indicator belongs as described in Table I below. The depth of the body 20 is typically in the range of from ½ inch to 1 inch.

TABLE I

| Size Group | Nominal Diameter | | | |
|---|---|---|---|---|
| | Greater Than | | Up to and Including | |
| | inches | mm | inches | mm |
| 0 | 1 | 25 | 1-⅜ | 35 |
| 1 | 1-⅜ | 35 | 2 | 50 |
| 2 | 2 | 50 | 2-⅜ | 60 |
| 3 | 2-⅜ | 60 | 3 | 76 |
| 4 | 3 | 76 | 3-¾ | 95 |

Removably attached to the rear of the body 20 is a rear cover 22. The rear cover 22 is a flat sheet of rigid material and is preferably attached to the body 20 by a plurality of screws 24 that extend through holes 26 in the rear cover and turn into a like number of threaded holes 28 in the body 20. Optionally, as in FIG. 3, a mounting lug 30 extends outwardly from the back of the rear cover 22. The mounting lug 30 can have a variety of shapes depending on the expected use of the indicator 10. In a first configuration, the mounting lug 30 extends perpendicularly from the rear cover 22 and is substantially flat with a through hole 32, that has an axis parallel to the rear cover 22. In another configuration, the mounting lug is a cylinder with or without a threaded axial hole. In yet another configuration, the mounting lug is a flat disk with a bisecting groove and a threaded hole.

Figure 4:
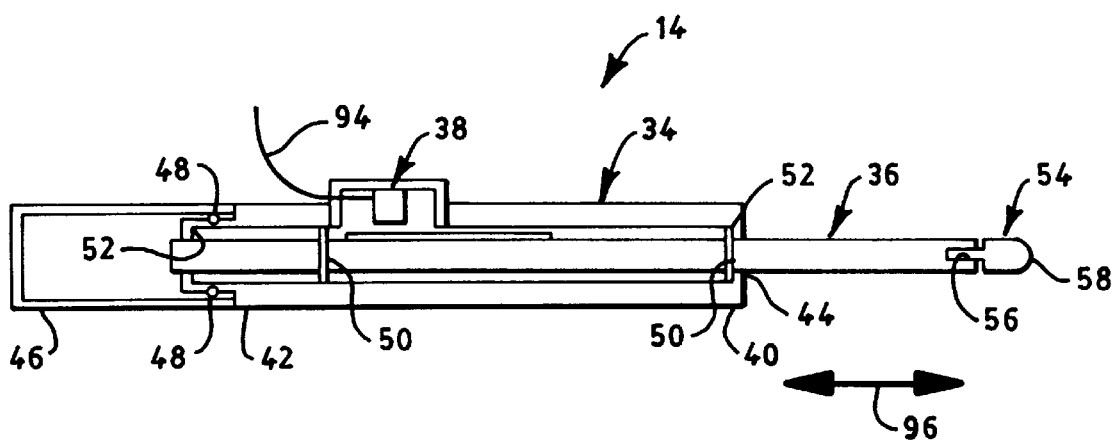
FIG. 4 is a cross-sectional view of a typical transducer employed by the present invention.

A transducer 14 for use by the indicator of the present invention is shown in cross-section in FIG. 4. The described transducer is typical of what is available in the art for providing a linear displacement measurement. All transducers that provide the same or equivalent functionality as described herein are contemplated for use with the present invention.

The typical transducer 14 includes a hollow sleeve 34, a spindle 36, and a sensor 38. The sleeve 34 is generally cylindrical, and both ends, the lower stem 40 and the upper stem 42, extend from the housing body 20 in opposite directions. The distal end of the lower stem 40 has an aperture 44 that is aligned with the axis of the sleeve 34. The distance that the lower stem 40 extends from the body 20 depends upon the ASME Standard group to which the indicator 10 belongs.

The distal end of the upper stem 42 accepts a threaded or press-fit hollow dust cap 46. Typically an O-ring 48 provides a seal to keep contaminates out of the dust cap 46 when installed. The upper stem 42/dust cap 46 extends at least ¼ inch from the surface of the body 20, and has a maximum length that is dependent upon the maximum displacement of the spindle 36, as described below.

The spindle 36 is a rod that reciprocates axially through the sleeve 34, as at 96, and is spring-biased to extend out of the lower stem aperture 46. Stops provide a means for limiting the reciprocal motion of the spindle 36. One method of implementing stops, as shown in FIG. 4, is a pair of C-clips 50 on the spindle 36 that stop the spindle 36 when they come in contact with shoulders 52 at the ends of the sleeve 34. When the spindle 36 is pushed into the sleeve 34 during a measurement, it extends from the sleeve 34 into the dust cap 46, explaining why the length of the upper stem 42/dust cap 46 depends upon the displacement of the spindle 36.

A knob 54 screws into a threaded hole 56 at the end of the spindle 36. The distal end of the knob 52 is the contact point 98, the point that makes contact with the work piece. In common usage, the component that screws into the end of the spindle 36 is the "contact point." However, in order to differentiate between the point that makes contact with the work piece and the screw-in component, this application uses the term "knob" for the screw-in component 54 and the term "contact point" for the point 98 that makes contact with the work piece. The contact point 98 is located on the contact surface 58. The contact surface 58 is preferably constructed of a wear-resistant material, such as hardened steel, tungsten carbide, or diamond. The shape of the surface 58 can range from flat to convex to tapered with a radius of curvature at the tip as small as 0.01 inch. The contact surface 58 is preferably smooth and uniform. The ASME Standard proscribes the minimum distance between the contact point 98 and the center of the through hole 32 of the first mounting lug configuration. These distances are set out in Table II below. The length of the lower stem 40 depends on the minimum distance as set out in Table II and the length of the knob 54. The length of the lower stem 40 is determinated by the position of the transducer 14 within the housing body 20. The transducer 14 is installed in the body 20 and fixed into its preferred position by a set screw 92.

TABLE II

| Size Group | Minimum Distance | |
|---|---|---|
| | inches | mm |
| 0 | 1-9/32 | 31 |
| 1 | 1-⅝ | 41 |
| 2 | 2 | 50 |
| 3 | 2-⅛ | 54 |
| 4 | 2-9/16 | 65 |

The transducer 14 uses a capacitive sensor 38 to measures the displacement of the spindle 36. A cable 94 extending from the transducer 14 provides the displacement measurement from the sensor 38. The capacitive sensor 38 is merely illustrative and other technologies capable of sensing displacement are contemplated by the present invention, including, but not limited to, inductive, resistive, and optical encoding.

The bezel 60 contains the controller 16, display 18, and battery compartment 62, and is rotatably attached to the front of the body 20. There is an O-ring 68 between the body 20 and bezel 60 to prevent contaminates from entering the housing 12. The outer surface of the bezel 60 is optionally knurled or fluted, as at 70, for ease in manually rotating the bezel 60. The battery compartment 62 is accessed through the side of the bezel 60. Optionally, the battery compartment 62 is accessed by removing the bezel 60. optionally, the battery compartment 62 is located in the body 20.

The controller 16 takes inputs from the sensor 38 and user, operates on them, and provides the appropriate outputs to the display 18 and the optional external connector 64. The controller 16 receives the sensor measurement from the transducer 14 via the transducer output cable 94. A number of standard connection techniques can be employed to connect the cable 94 to the controller 16, preferably a technique that allows the bezel 60 to be rotated about the body 20 with a minimum of wear to the connection. The preferred method is to use a flexible printed circuit cable 94 with exposed conductive pads and a mating connector on the controller 16.

The user inputs allow the user to set various operating modes and parameters. The indicator 10 may implement a key, an attachment to the indicator 10 that provides the level of security access necessary to set the indicator 10 to particular modes. The operating modes are indicated by the mode icons 84 on the display described below. One typical operating mode is whether the displayed measurement is in inches or millimeters. Another is the measurement direction, either positive or negative, that a change in displacement is displayed. Yet another is the analog scale factor, the resolution of the bar graph 82 described below. Operating parameters that can be set include measurement limits, measurement resolution, and a fixed offset. These modes and settable parameters are merely illustrative of the capabilities typically built into an electronic indicator and none are necessary to the present invention. Other modes or parameters may be included.

User inputs are by either pushbuttons and/or the external connector 64. In the current implementation, there are three pushbuttons on the face of the bezel 60. The pushbuttons may be located elsewhere, such as on the side of the bezel 60. The pushbuttons are used to set the operating parameters and modes of the indicator 10. The first pushbutton 86 toggles the display value between inches and millimeters. The second pushbutton 88 puts the indicator into setup mode and turns the indicator 10 off. The third pushbutton 90 turns the indicator 10 on and zeroes the measurement. The present invention also contemplates that fewer or greater numbers of pushbuttons can be used.

The pushbuttons are used in various combinations and sequences to set up the operating modes and parameters of the indicator 10. For example, pressing the first pushbutton 86 and second pushbutton 88 at the same time puts the indicator 10 into setup mode, and then pressing the second pushbutton 88 toggles through the various setup displays until returning to the operating mode. When in a particular setup display, for example, the upper limit setup display, repeatedly pressing the first pushbutton 86 toggles through the digits of the upper limit to select the digit to set, and repeatedly pressing the third pushbutton 90 toggles through the numerals 0–9 for the selected digit. This example is merely illustrative, and there are many other possible combinations of pushbuttons for setting and adjusting the various operating modes and parameters.

One adjustable operating parameter, and the subject of the present invention, is the ratio of the actual displacement of the spindle 36 to the value that is displayed. As indicated above, currently available electronic indicators carried their fixed ratios over from the mechanical dial indicators. The introduction of electronics in the late 1970's allowed manufacturers to incorporate some new measurement modes into electronic indicators, but an adjustable displacement-to-display ratio, which had never been incorporated in the mechanical dial indicators, has never been incorporated into an electronic indicator until the present invention.

The controller 16 reads the displacement measurement from the sensor 38 at regular intervals, converts the sensor measurement to a value representing the displacement of the spindle 36 in standard units of length from its reference position, and displays the displacement value on the numerical display 78 and bar graph 82. Prior to displaying the displacement value on the numerical display 78, the sensor measurement must go through several logical conversions to make it understandable to the user. The term "logical" is used here because the conversions may not actually occur as indicated. There are a number of different ways to perform mathematical conversions of numbers. For example, if the conversion is linear scaling, a straight multiplication can be used. Alternatively, a table lookup can be used. Also, more than one conversion can be performed simultaneously by pre-multiplying scaling factors and using the result as a single scaling factor.

In the first logical conversion, the sensor measurement is scaled by a factor that represents the ratio of the sensor measurement units (su) to each unit of spindle displacement in standard length units, such as inches or millimeters. For example, the sensor measurement may change by 4 su for each 0.001 mm change in displacement of the spindle. Thus, the sensor measurement in su must be scaled by $0.25 \times 10^{-3}$ in order to directly indicate the actual displacement of the spindle in millimeters (4 su $\times 0.25 \times 10^{-3}$ mm/su=$10^{-3}$ mm=0.001 mm). Alternatively, the transducer 14 includes an internal processor that converts its output by the scale factor and provides the already-scaled output to the display assembly.

The second logical conversion is from the internal binary representation of the displacement value to a decimal number that the typical user understands, and from there to convert each digit of the decimal number to the seven segments of each numeral of the display 80. Likewise, prior to displaying the displacement value on the bar graph 82, the value must be operated on to determine the number of bars to show based on the analog scale factor.

The present invention adds a third logical conversion, scaling the displacement value by a displacement-to-display ratio. For example, with the displacement-to-display ratio of 3:2 from the above example, each 2 mm of actual spindle displacement represents a change of 3 mm in the work piece. Consequently, prior to displaying the displacement value the actual spindle displacement is scaled by 1.5 to obtain the display value. The ratio multiplier may be used to adjust the numerical display value, the bar graph value, or both.

The order in which the conversions are performed is not important to the present invention, since the outcome will be the same in any order, given the associative property of multiplication. However, there may be issues of resolution that determine which conversion is performed first. It may also be more efficient to multiply the two conversion factors together, and using the result to scale the sensor measurement.

In the current implementation of the present invention, the sensor measurement conversion and the binary-to-BCD conversion occurs at the same time, that is, the sensor measurement is converted directly to displacement units in BCD. Then the displacement-to-display scaling is performed on the BCD value.

In the current implementation of the present invention, the mathematical calculations involved in the conversions is performed by a programmed microprocessor. However, it is well-known that most processes that can be programmed into a microprocessor can also be performed by purely hardware means employing the appropriate logic gates. In such a case, for example, the displacement-to-display ratio may reside in a hardware register that is settable by the user and the scaling of the displacement units to display units is performed by a hardware multiplier. The present invention contemplates that the mathematical conversions may be performed either in software running in a microprocessor, in hardware, or in a combination of the two.

The display 18 is visible on the face 74 of the bezel 60. It is preferably of the liquid crystal type for power saving purposes, although all other display types, such as light-emitting diode and fluorescent gas, are contemplated. The display 18 typically has a numerical display 78 of seven decimal digits 80 with decimal points and a negative sign. Optionally, the display 18 includes a bar graph 82 to display the measurement in an analog form. The display 18 also has a variety of mode icons 84 for displaying the operating status and modes of the indicator 10, for example, whether inches or millimeters are being displayed, what setup mode the indicator 10 is in, and the analog magnification multiplier.

As indicated above, the user inputs and measurement outputs may be by an external connector 64 that is attached to the body 20 so that it is accessible to the outside. An interconnecting cable 66 connects the controller 16 to the external connector 64. Preferably a flexible circuit similar to that described above with reference to the transducer/controller connection is used.

The type of external connector 64 and the form of the signals, whether analog or digital and the encoding of the signals, depend upon the type of instrument with which the indicator 10 will interface. Possible encoding schemes include binary, binary coded decimal (BCD), and ASCII characters.

Thus it has been shown and described an adjustable display ratio electronic indicator which satisfies the objects set forth above.

Since certain changes may be made in the present disclosure without departing from the scope of the present invention, it is intended that all matter described in the foregoing specification and shown in the accompanying drawings be interpreted as illustrative and not in a limiting sense.

What is claimed is:

1. An electronic indicator that internally scales all measurements by an adjustable displacement-to-display ratio, said electronic indicator comprising:
   (a) a housing;
   (b) a transducer having a sleeve mounted within and extending from said housing, an axially reciprocating spindle extending from said sleeve and having a displacement relative to said sleeve, and a sensor measuring said displacement and providing a sensor measurement representative of said displacement;
   (c) a controller within said housing, said controller receiving said sensor measurement and including sensor measurement scaling means for scaling said sensor measurement to an actual displacement in standard length units, display scaling means for scaling said actual displacement by said displacement-to-display ratio to obtain a display value, and adjustment means for adjusting said displacement-to-display ratio; and
   (d) a display within said housing for displaying said display value.

2. The electronic indicator of claim 1 wherein said controller includes a programmable processor programmed to provide said sensor measurement scaling means and said display scaling means.

3. The electronic indicator of claim 2 wherein said controller includes at least one pushbutton on said housing and said programmable processor is programmed to use said at least one pushbutton to provide said adjustment means.

4. The electronic indicator of claim 1 wherein said housing includes a body in which said sleeve is mounted and a bezel rotatably attached to said body, said bezel including said controller and said display.

5. The electronic indicator of claim 1 wherein said indicator includes an output connector for providing external access to at least one of said sensor measurement, said actual displacement, and said display value.

6. An electronic indicator that scales all measurements by an adjustable displacement-to-display ratio, said electronic indicator comprising:
   (a) a housing including a body and a bezel rotatable mounted to said body;
   (b) a transducer having a sleeve mounted within and extending from said body, an axially reciprocating spindle extending from said sleeve and having a displacement relative to said sleeve, and a sensor measuring said displacement and providing a sensor measurement representative of said displacement;
   (c) a controller within said bezel, said controller including at least one pushbutton and a programmable processor for receiving said sensor measurement, said processor being programmed to scale said sensor measurement to an actual displacement in standard length units, to scale said actual displacement by said displacement-to-display ratio to obtain a display value, and to use said at least one pushbutton to for adjusting said displacement-to-display ratio; and
   (d) a display within said housing for displaying said display value.

7. The electronic indicator of claim 6 wherein said indicator includes an output connector for providing external access to at least one of said sensor measurement, said actual displacement, and said display value.

* * * * *